United States Patent
Austrheim et al.

(10) Patent No.: US 11,691,635 B2
(45) Date of Patent: Jul. 4, 2023

(54) STORAGE GRID WITH CONTAINER ACCESSING STATION WITH LOCKING DEVICE TO LOCK REMOTELY OPERATED VEHICLE

(71) Applicant: Autostore Technology AS, Nedre Vats (NO)

(72) Inventors: Trond Austrheim, Etne (NO); Øystein Gjerdevik, Skjold (NO); Ingvar Fagerland, Kolnes (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 16/972,482

(22) PCT Filed: Jun. 11, 2019

(86) PCT No.: PCT/EP2019/065204
§ 371 (c)(1),
(2) Date: Dec. 4, 2020

(87) PCT Pub. No.: WO2019/238673
PCT Pub. Date: Dec. 19, 2019

(65) Prior Publication Data
US 2021/0269240 A1    Sep. 2, 2021

(30) Foreign Application Priority Data

Jun. 12, 2018 (NO) .................................. 20180813
Jul. 19, 2018 (NO) .................................. 20181005

(51) Int. Cl.
*B60W 50/00* (2006.01)
*G05D 1/00* (2006.01)
(Continued)

(52) U.S. Cl.
CPC ....... *B60W 50/0098* (2013.01); *B65G 1/0414* (2013.01); *B65G 1/0457* (2013.01);
(Continued)

(58) Field of Classification Search
CPC ............. B61B 13/00; B66F 9/063; B66F 9/19
See application file for complete search history.

(56) References Cited

U.S. PATENT DOCUMENTS

| | | |
|---|---|---|
| 3,519,150 A | 7/1970 | Keena et al. |
| 3,800,963 A | 4/1974 | Holland |

(Continued)

FOREIGN PATENT DOCUMENTS

| | | |
|---|---|---|
| CA | 2988122 A1 | 12/2016 |
| CN | 101553416 A | 10/2009 |

(Continued)

OTHER PUBLICATIONS

Office Action in counterpart Chinese Patent Application No. 201980039028.7 dated Oct. 27, 2021 (15 pages).

(Continued)

*Primary Examiner* — Saul Rodriguez
*Assistant Examiner* — Ashley K Romano
(74) *Attorney, Agent, or Firm* — Osha Bergman Watanabe & Burton LLP

(57) ABSTRACT

An automated storage and retrieval system includes a grid-based rail structure and a plurality of remotely operated vehicles arranged to operate on the grid-based rail structure. The automated storage and retrieval system includes a locking device arranged in a zone of the grid-based rail structure where a human and/or a robotic operator is permitted to interact with the remotely operated vehicle or contents of a storage container that the remotely operated vehicle is carrying. The locking device is arranged to lock the remotely operated vehicle against accidental displace- (Continued)

ment prior to interaction with the human and/or robotic operator, and wherein the locking device being arranged to unlock the remotely operated vehicle once interaction with the human and/or robotic operator is no longer required.

8 Claims, 11 Drawing Sheets

(51) Int. Cl.

| | | |
|---|---|---|
| *B65G 1/04* | (2006.01) | |
| *B65G 1/06* | (2006.01) | |
| *B66F 9/19* | (2006.01) | |
| *B65G 47/06* | (2006.01) | |
| *B65G 47/52* | (2006.01) | |
| *B65G 57/03* | (2006.01) | |
| *B65G 63/06* | (2006.01) | |
| *B65G 65/23* | (2006.01) | |
| *B66F 9/06* | (2006.01) | |
| *G05D 1/02* | (2020.01) | |
| *B65G 67/24* | (2006.01) | |
| *B65G 43/00* | (2006.01) | |
| *B65G 1/137* | (2006.01) | |
| *B65G 63/00* | (2006.01) | |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 43/00* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 2710/06* (2013.01); *B60W 2720/10* (2013.01); *B60W 2720/24* (2013.01); *B65G 1/1378* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(56) References Cited

U.S. PATENT DOCUMENTS

| | | | |
|---|---|---|---|
| 4,538,950 A | 9/1985 | Shiomi et al. | |
| 4,909,697 A | 3/1990 | Bernard, II et al. | |
| 5,078,566 A | 1/1992 | Ferrence | |
| 5,360,306 A | 11/1994 | Nakayama et al. | |
| 5,538,809 A | 7/1996 | Bittihn et al. | |
| 7,101,139 B1 | 9/2006 | Benedict | |
| 8,628,289 B1* | 1/2014 | Benedict | B65G 1/0478 414/217 |
| 9,020,632 B2* | 4/2015 | Naylor | B65G 1/0492 414/277 |
| 9,527,669 B1 | 12/2016 | Hanssen et al. | |
| 2003/0093176 A1 | 5/2003 | Ohtsuka et al. | |
| 2005/0047895 A1 | 3/2005 | Lert | |
| 2008/0014062 A1 | 1/2008 | Yuyama et al. | |
| 2011/0027059 A1 | 2/2011 | Benedict et al. | |
| 2012/0282068 A1 | 11/2012 | Tschurwald et al. | |
| 2014/0014470 A1 | 1/2014 | Razumov | |
| 2014/0086714 A1* | 3/2014 | Malik | B65G 1/0492 414/273 |
| 2014/0277693 A1 | 9/2014 | Naylor | |
| 2014/0288696 A1 | 9/2014 | Lert | |
| 2014/0292274 A1 | 10/2014 | Dorval et al. | |
| 2014/0311858 A1 | 10/2014 | Keating et al. | |
| 2016/0060037 A1 | 3/2016 | Razumov | |
| 2016/0137435 A1 | 5/2016 | Tanaka et al. | |
| 2016/0176638 A1 | 6/2016 | Toebes | |
| 2016/0325932 A1* | 11/2016 | Hognaland | B65G 1/0464 |
| 2016/0347544 A1* | 12/2016 | Kvifte | E06C 7/12 |
| 2017/0057745 A1 | 3/2017 | Ueda et al. | |
| 2017/0166400 A1 | 6/2017 | Hofmann | |
| 2018/0044110 A1* | 2/2018 | Clarke | B65G 1/0464 |
| 2018/0068253 A1 | 3/2018 | Simms et al. | |
| 2018/0082162 A1 | 3/2018 | Durham et al. | |
| 2018/0118078 A1 | 5/2018 | Alkhaldi et al. | |
| 2018/0141754 A1 | 5/2018 | Garrett et al. | |
| 2018/0150793 A1 | 5/2018 | Lert, Jr. et al. | |
| 2018/0244469 A1* | 8/2018 | Testa | G07F 11/165 |
| 2019/0168963 A1* | 6/2019 | Goodman | G11B 17/22 |
| 2020/0048005 A1* | 2/2020 | Kraetsch | B65G 1/1375 |
| 2020/0148474 A1 | 5/2020 | Salichs et al. | |
| 2021/0163222 A1* | 6/2021 | Austrheim | B65G 1/0471 |
| 2021/0387804 A1* | 12/2021 | Austrheim | G07F 11/62 |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 A | 6/2017 |
| CN | 206790852 U | 12/2017 |
| CN | 108140168 A | 6/2018 |
| DE | 40 16 810 C1 | 11/1991 |
| DE | 9310690 U1 | 9/1993 |
| DE | 102009017241 A1 | 10/2010 |
| EP | 0458021 A1 | 11/1991 |
| EP | 0534558 A1 | 3/1993 |
| EP | 2881905 A1 | 6/2015 |
| EP | 3003932 A1 | 4/2016 |
| GB | 1 267 751 A | 3/1972 |
| GB | 1276160 A | 6/1972 |
| GB | 2106070 A | 4/1983 |
| GB | 2233319 A | 1/1991 |
| JP | S6417707 A | 1/1989 |
| JP | S6485656 A | 3/1989 |
| JP | H07-067623 B2 | 7/1995 |
| JP | H09-152914 A | 6/1997 |
| JP | 2017088404 A | 5/2017 |
| KR | 20170026074 A | 3/2017 |
| NO | 317366 B1 | 10/2004 |
| RU | 2008111257 A | 10/2009 |
| WO | 96/14258 A1 | 5/1996 |
| WO | 2005/077789 A1 | 8/2005 |
| WO | 2012/106746 A1 | 8/2012 |
| WO | 2012106746 A1 | 8/2012 |
| WO | 2012106747 A1 | 8/2012 |
| WO | 2014/075937 A1 | 5/2014 |
| WO | 2014/090684 A1 | 6/2014 |
| WO | 2014/195901 A1 | 12/2014 |
| WO | 2015/084236 A1 | 6/2015 |
| WO | 2015084236 A1 | 6/2015 |
| WO | 2015/140216 A1 | 9/2015 |
| WO | 2015/193278 A1 | 12/2015 |
| WO | 2015193278 A1 | 12/2015 |

(56) References Cited

FOREIGN PATENT DOCUMENTS

| WO | 2016/166323 | A1 | 10/2016 |
|---|---|---|---|
| WO | 2016/196815 | A1 | 12/2016 |
| WO | 2016/198467 | A1 | 12/2016 |
| WO | 2016/198565 | A1 | 12/2016 |
| WO | 2017/081281 | A1 | 5/2017 |
| WO | 2017081273 | A1 | 5/2017 |
| WO | 2017/121515 | A1 | 7/2017 |
| WO | 2017/153563 | A1 | 9/2017 |
| WO | 2017/211640 | A1 | 12/2017 |
| WO | 2018/162757 | A1 | 9/2018 |
| WO | 2018/233886 | A1 | 12/2018 |

OTHER PUBLICATIONS

Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Office Action issued in Chinese Application No. 201980037162.3; dated Sep. 27, 2021 (8 pages).
Extended European Search Report issued in European Application No. 21186410.3, dated Nov. 25, 2021 (5 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action issued in the counterpart Chinese Patent Application No. 201980039066.2, dated Sep. 10, 2021 (10 pages).
Search issued in the counterpart Chinese Patent Application No. 201980039066.2, dated Sep. 6, 2021 (3 pages).
Office Action in counterpart Chinese Patent Application No. 201980038106.1 dated Sep. 8, 2021 (6 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
Norwegian Serach Report Issued in Corresponding Norwegian Application No. 20151005, dated Feb. 6, 2019 (2 Pages).
PCT Written Opinion issued in Correspond PCT Application No. PCT/EP2019/065204, dated Dec. 19, 2019 (10 Pages).
PCT Search Report issued in Correspond PCT Application No. PCT/EP2019/065204, dated Dec. 19, 2019 (4 Pages).
English Translation of Office Action issued in counterpart Chinese Patent Application No. 2019800973971 dated Dec. 23, 2022 (15 pages).
Office Action issued in counterpart Japanese Patent Application No. 2020-568727 dated Mar. 30, 2023 (8 pages).

* cited by examiner

A

B

A

B

A

B

A

B

A

B

STORAGE GRID WITH CONTAINER ACCESSING STATION WITH LOCKING DEVICE TO LOCK REMOTELY OPERATED VEHICLE

The present invention is related to an automated storage and retrieval system comprising a locking device arranged to lock the remotely operated vehicle against accidental displacement prior to interaction with the human and/or robotic operator, and wherein the locking device being arranged to unlock the remotely operated vehicle once interaction with the human and/or robotic operator is no longer required. The invention is also directed to a method of accessing a storage container through a container accessing station.

BACKGROUND AND PRIOR ART

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 of storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked. The automated storage and retrieval system 1 comprises a rail system 108 arranged in a grid pattern across the top of the storage 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single rail system, as is shown in FIG. 2A. Alternatively, the rail system 108 may be a double rail system, as is shown in FIG. 2B, thus allowing a container handling vehicle 201 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station, and the second delivery column 120 may comprise a dedicated pick-up port where the container handling vehicles 200,300 can pick up storage containers 106 that have been transported through the delivery column 120 from an access or a transfer station. Each of the ports of the first and second delivery column may comprise a port suitable for both pick up and drop of storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119.

If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

A container accessing station may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

The picking and stocking operation at the container accessing station may be performed by a human operator. Despite measures being in place already to reduce a risk that the human operator may injure himself/herself, improvements are always desirable. In addition, as robotic operators, such as robotic arms, become more common in these areas, it is also desirable to avoid damage to those devices, wherever possible.

An objective of the invention is therefore to provide an automated storage and retrieval system which is more effective than prior art systems at avoiding or at least reducing harm to a human operator and/or a robotic operator.

Yet another objective is to provide an area where storage containers and items held in the storage containers effectively and easily can be handled with safety.

SUMMARY OF THE INVENTION

The present invention is directed to an automated storage and retrieval system comprising a grid-based rail structure and a plurality of remotely operated vehicles arranged to operate on the grid-based rail structure.

The automated storage and retrieval system comprises a locking device arranged in a zone of the grid-based rail structure where a human and/or a robotic operator is permitted to interact with the remotely operated vehicle or contents of a storage container that the remotely operated vehicle is carrying.

The locking device is arranged to lock the remotely operated vehicle against accidental displacement prior to interaction with the human and/or robotic operator (e.g., once access has been allowed to the remotely operated vehicle or the contents of the storage container). The locking device is also arranged to unlock the remotely operated vehicle once interaction with the human and/or robotic operator is no longer required (e.g., when access to the remotely operated vehicle or the contents of the storage container is no longer possible).

The grid-based rails structure may comprise at least a first set of parallel rails arranged in a horizontal plane (P, P1)) and extending in a first direction (X), and at least a second set of parallel rails arranged in the horizontal plane (P,P1) and extending in a second direction (Y) which is orthogonal to the first direction (X), the first and second sets of rails together defining a grid of grid cells.

The accidental displacement may occur e.g. as a result of an impact from another vehicle moving on the grid, when the vehicle is at a point on a grid where there is potential for human interaction and/or interaction with a robotic operator, in particular an access point, for example, as a health and safety type-solution to prevent a hand or finger of a human, or the mechanical hand or grabbing device of a robotic operator, becoming trapped. Thus, the invention is directed to the locking of the vehicle against accidental displacement when there is the potential for human interaction (or robotic operator interaction).

The locking device may be appropriate for wherever there is some human interaction (or human/robotic operator interaction) and where the locking device is not going to interfere with storage or some other consideration. The locking device could be appropriate, for example, in a service area which is connected with the storage grid or at a container accessing station adapted for handling of items held in the storage containers by a robotic operator or human operator.

The locking device is a vehicle locking device, arranged to lock (in the sense of restraining displacement of) a remotely operated vehicle to a grid cell of a grid system.

The locking device may be adapted to be mounted externally from the vehicle, i.e. on the grid structure, rail system or on an external structure such as a cabinet of an access station.

The locking device may comprise a locking element arranged to prevent the vehicle from moving in at least any of the X- or Y-direction. Thus, the locking element may restrain the vehicle such that it is prevented from moving.

The locking element may be at least any one of: a magnet, a spring-loaded device, a gripper, a lift, a barrier or an interacting device for interacting with the vehicle.

For example, the locking device may comprise a blocking member moved adjacent to one or more sides of the vehicle. Such a solution is likely to create an obstruction to vehicles wishing to pass on adjacent grid cells since it would take up space in adjacent cells, and so may only be appropriate an ability to pass is not required.

Alternative locking devices may comprise (this list being non-exhaustive): pins that could project from the track to interfere with the wheels to lock the vehicle in position, bolts that drop down from the top inner surface of the station to engage with the sides or corners of the container, retractable barriers such as walls may be raised or lowered keep the vehicle in position, a pin(s) which projects from a side of the access station into a hole(s) in a side of the vehicle, a magnetic clamp, or a device to lift the vehicle up off the tracks or tilt the vehicle so that it is no longer free to roll, for example.

The locking device may comprise an actuator for moving the locking element. The actuator may comprise a motor. The actuator may comprise an electronic, a pneumatic or a hydraulic actuator, and may produce rotational, linear or a combination of rotational and linear, displacement in the locking element.

The locking element may be a locking bolt arranged on the grid-based rail structure for interacting with the remotely operated vehicle such that the remotely operated vehicle is locked to the grid-based rails structure.

The locking device may comprise a support which holds the locking element in position within a grid cell of the grid-based rail structure.

The locking device may comprise a panel structure adapted to be mounted within a grid cell of the grid. The locking element may be moveable through an opening provided on the panel structure.

The panel structure may comprise a support that the locking device is attached to which is configured (size and shape) to attach to the rails of the grid-bases rails structure.

The actuator and the locking bolt may be mounted on an underside of the panel structure and wherein the locking bolt, when activated, may protrude from a top surface of the panel structure and into an opening provided in the remotely operated vehicle. The locking bolt the locking device may be arranged such that the locking bolt extends into the vehicle opening for holding the vehicle in a locked position on the grid cell.

The actuator for moving the locking bolt may comprise a moveable arm. The moveable arm when activated may lift the locking bolt from an open position (not lifted) to a locked position (lifted) such that it extends into the opening provided in the remotely operated vehicle.

The grid-based rail structure may be a delivery rail system and the remotely operated vehicle may be a delivery vehicle operating on the delivery rail system.

The delivery rail system may comprise at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells.

The delivery vehicle may comprise a motorized vehicle body and a container carrier provided above the motorized vehicle body for carrying a storage container of the storage containers, and wherein the delivery vehicle may be moveable on the delivery grid of the delivery rail system. The delivery vehicle may be arranged to receive a storage container from a delivery column of a storage and retrieval grid and deliver the storage container to a container accessing station where the items stored in the storage container may be accessed by a human and/or robotic operator. After the storage container has been accessed, the delivery vehicle may return the storage container to the or another delivery column for transfer of the storage container to a storage location in the storage and retrieval grid.

The delivery system provides an effective storage and retrieval system by increasing the delivery capacity from the delivery column of the storage grid. That is when a storage container is delivered through the delivery column, the delivery vehicle receives the storage container through the delivery port of the delivery column and transports the storage container instantly away from the delivery column such that the delivery column is immediately ready for the next lifting or lowering operation. This provides and effective system by preventing congestion of storage container at the delivery column of a storage and retrieval grid.

The container accessing station may be a zone of the grid-based rail structure where a human and/or a robotic operator is permitted to interact with the remotely operated vehicle or contents of a storage container that the remotely operated vehicle is carrying.

The zone may be an access point adapted for handling of items held in the storage containers by a robotic operator or human operator.

The delivery grid may provide one or more delivery grid cells for the remotely operated delivery vehicle at the access point as well as a plurality of delivery grid cells adjacent the one or more delivery grid cells of the access point, such that there is more than one path to and/or from the access point for the remotely operated delivery vehicle via the plurality of delivery grid cells.

This arrangement of the delivery grid cells, while it offers benefits in terms of options for routing vehicles, it means that a parked vehicle at the access station is potentially more likely to be bumped by a vehicle maneuvering on an adjacent grid cell. This is because there are more possibilities for movement than compared to a conventional conveyor arrangement. Moreover, any contact between the vehicles has more potential to injure or damage the human/robotic operator because the weight of a moving vehicle carrying a storage container results in additional momentum being transferred at the point of contact as compared to storage containers that are being moved on rollers or conveyors.

The access point may be arranged in the container accessing station and wherein the delivery grid may extend to or into the container accessing station.

The container accessing station may comprises a cabinet comprising walls and a top cover supported thereon, wherein the items held in the storage container carried by the delivery vehicle at the access point is reachable through an access opening in the top cover.

The container accessing station may comprise a deployable cover for restricting access through the access opening. The deployable cover may be a retractable cover. The cover may be arranged to open only if predetermined conditions are satisfied (e.g. if access to a container is authorised) and may thereby permit access to a container through the access opening when the container is at the second level. The retractable cover may be operated by a motor automatically opening/closing the cover or the retractable cover may be operated manually by a human and/or robotic operator after a lock has been activated.

The cover may be transparent and may allow the contents of a container to be viewed from outside the container accessing station.

The system may comprise one or more sensor arranged to detect a delivery vehicle in correct position for the locking device to be activated (raising the locking bolt) without damaging the remotely operated vehicle.

The sensor may be a magnet sensor, light sensor, pressure sensor, etc.

The system may further comprise a control system to perform the operating of the remotely operated vehicle, the locking of the vehicle and the opening of the retractable cover. Thus, the locking device may be synchronized with the retractable cover such that the cover can be opened only when the delivery vehicle is in a locked position by the vehicle locking device.

A first sensor may be arranged to register the position of the remotely operated vehicle on the grid cell such that the locking device may be activated.

A second sensor may be arranged to register the position of the locking element (locking position or non-locking position) and whether the remotely operated vehicle has been locked properly.

A third sensor may be arranged to register the position of the retractable cover.

The control system may be arranged to read the signals from the sensors and provide the operational command of opening and locking the retractable cover.

For example, the first sensor may register that the remotely operated vehicle is in a predetermined position on a grid cell and/or on a panel structure. The control system sends a signal to the motor which operate the lifting arm such that the locking bolt is lifted to a locking position and into interaction with the remotely operated vehicle, thereby locks the vehicle to the grid structure. The second sensor may send a signal to the control system when the locking bolt is in the locked position and that the remotely operated vehicle has been locked properly. Whereupon the control system sends a signal to the motor operating the retractable cover such that cover may be opened. The third sensor may send a signal to the control system when the retractable cover is in the open position allowing access through the access opening. The human and/or robotic operator may send a signal (for example by pushing a button or switch) when the item stored in the storage container has been accessed and the storage container is ready for returning to the storage grid. The control panel may thereafter close the cover such that access is no longer possible, and the control system may unlock the vehicle again by operating the locking bolt via the lifting arm and the motor.

The invention may also be seen to provide a method of reducing a risk of injury or damage to a human operator and/or a robotic operator that is permitted to interact with a remotely operated vehicle or contents of a storage container that the remotely operated vehicle is carrying in an automated storage and retrieval system comprising a grid-based rail structure and a plurality of remotely operated vehicles arranged to operate on the grid-based rail structure, the method comprising providing a locking device arranged to lock the remotely operated vehicle against accidental displacement prior to interaction with the human and/or robotic operator (e.g., once access has been allowed to the remotely operated vehicle all the contents of the storage container), and to unlock the remotely operated vehicle once interaction with the human and/or robotic operator is no longer required (e.g., when access to the remotely operated vehicle or the contents of the storage container is no longer possible).

The invention is also related to a method of accessing a storage container through a container accessing station of a delivery system.

The delivery system comprises:
a delivery rail system comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the first and second sets of rails together defining a delivery grid of delivery grid cells;
a remotely operated delivery vehicle comprising a motorized vehicle body and a container carrier provided above the motorized vehicle body for carrying a storage container of the storage containers, and wherein the delivery vehicle is moveable on the delivery grid of the delivery rail system; and an access point comprising an access opening through which a human and/or robot may access contents of the storage container carried into the access point on the delivery vehicle;

the access point comprises a retractable cover for closing and opening the access opening;

a vehicle locking device is arranged to lock the delivery vehicle at the access point; and a sensor for registering the position of the delivery vehicle;

the method comprises:

operating the delivery vehicle carrying the storage container to the delivery grid cell at the access point;

locking the delivery vehicle at the access point by the locking device when the sensor sends signal that the delivery vehicle is in position;

opening the retractable cover when the delivery vehicle is locked by the locking device;

accessing the storage container through the access opening;

closing the access opening by moving the retractable cover;

unlocking the delivery vehicle when retractable cover is closed.

BRIEF DESCRIPTION OF THE DRAWINGS

Following drawings are appended by way of example only to facilitate the understanding of the invention.

FIG. 7A shows a panel structure with a locking bolt and FIG. 7B shows a remotely operated vehicle positioned above the panel structure.

DETAILED DESCRIPTION OF THE INVENTION

Figure 1:
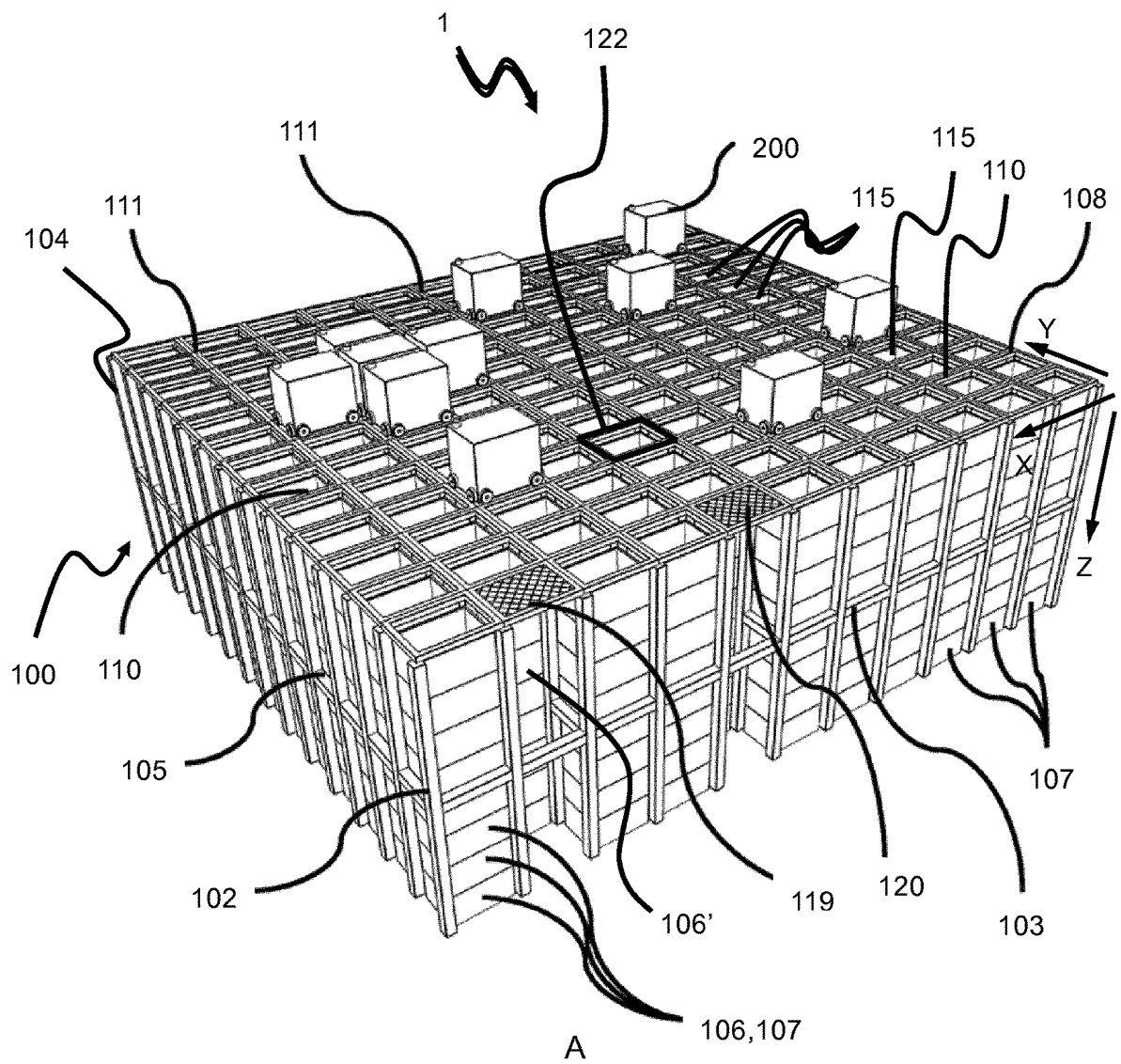
FIGS. 1 A-D are perspectives view of a prior art automated storage and retrieval system, where FIG. 1 A and FIG. 1 C shows the complete system and FIG. 1 B and FIG. 1 D shows examples of system operable prior art container handling vehicles.
Figure 1:
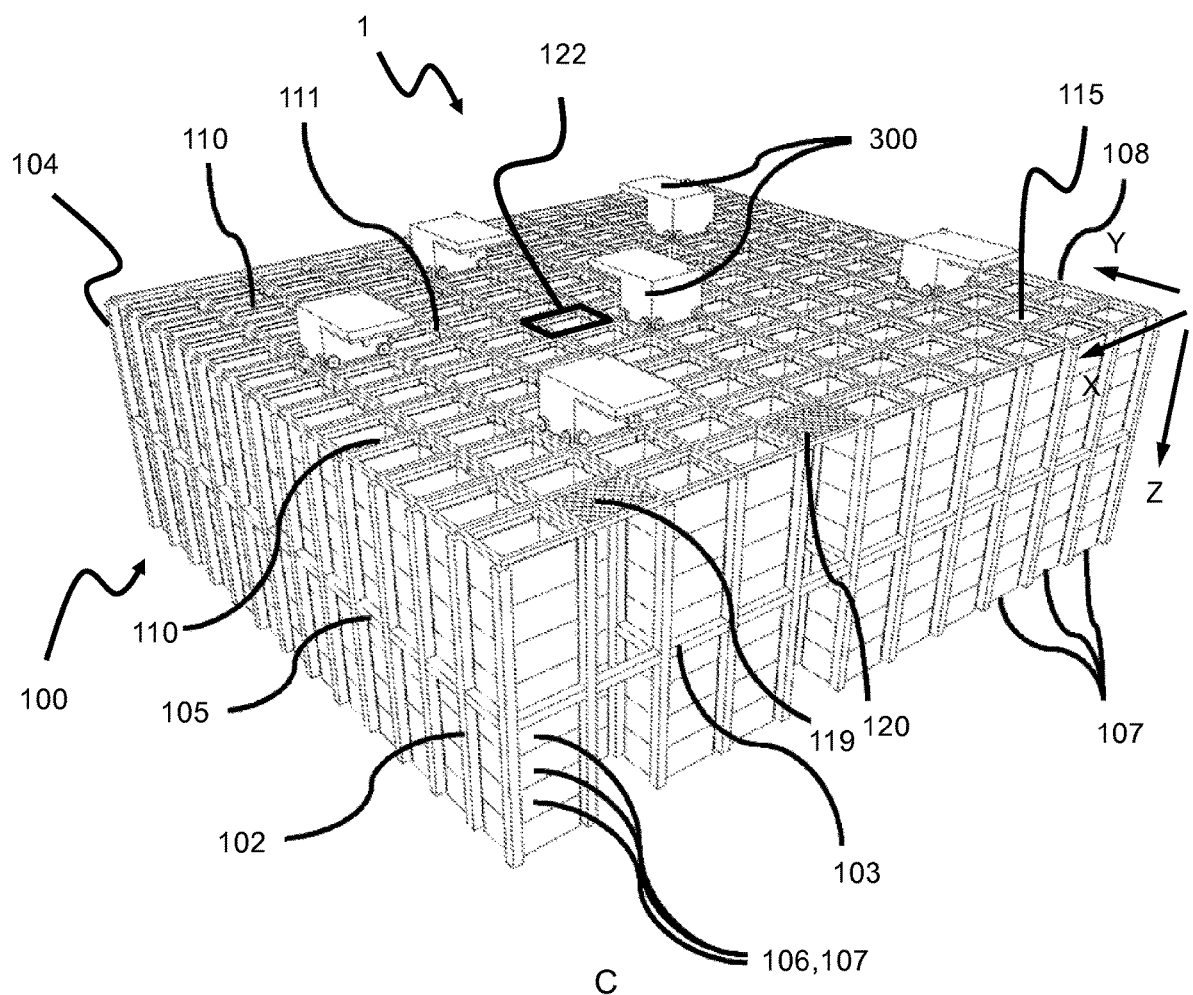
Figure 1:
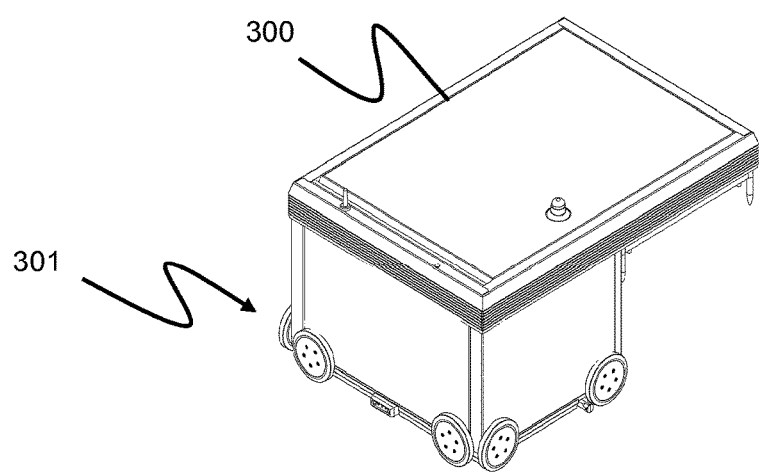

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes the rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIGS. 2B and 2C). In FIGS. 1A and 1C, such a grid cell 122 is marked on the rail system 108 by thick lines.

The rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

Figure 2:
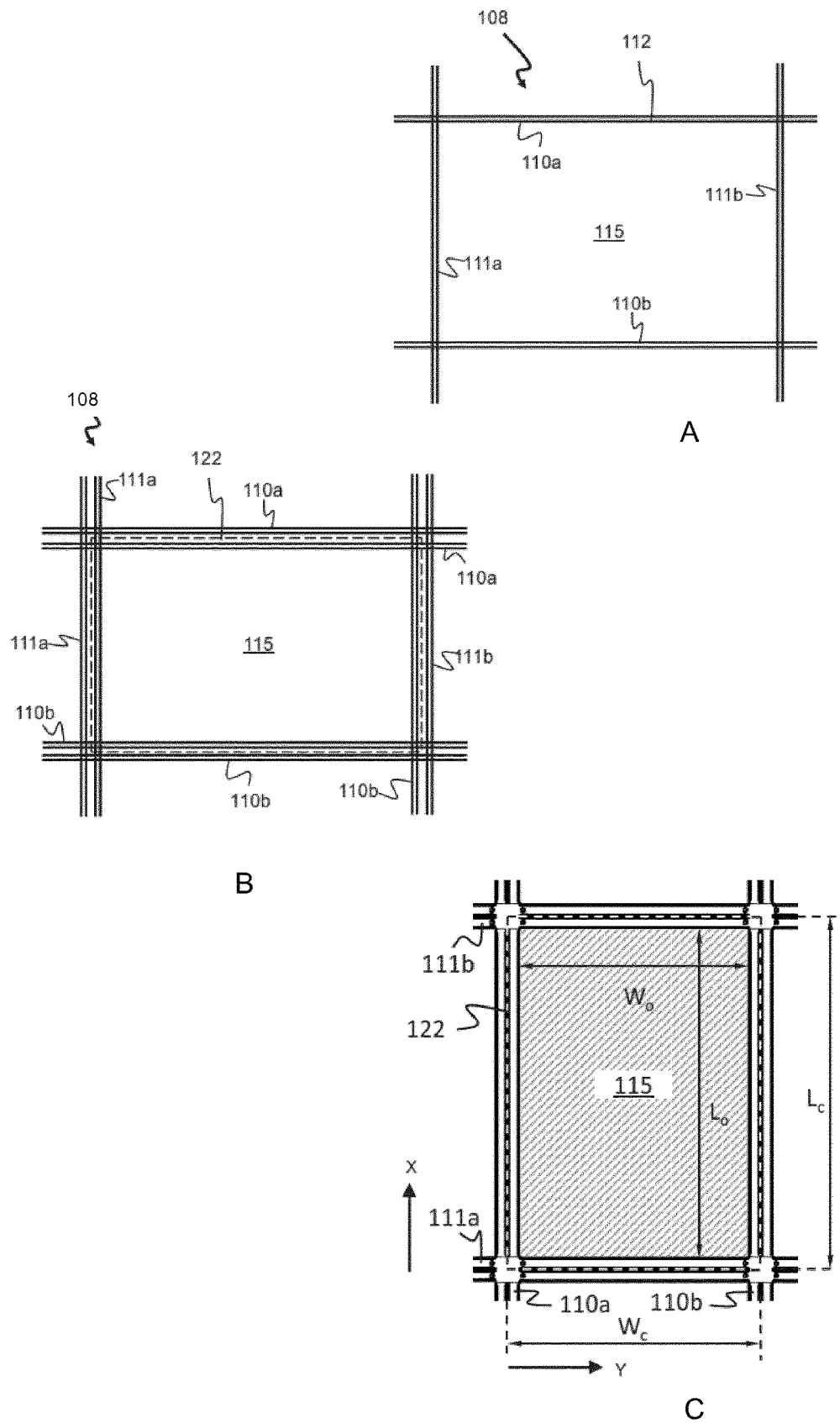
FIGS. 2 A-C is a view from top of a grid cell comprising a set of parallel rails arranged to guide movement of a remotely operated vehicle.

The rail system 108 may be a single rail system, as is shown in FIG. 2A. Alternatively, the rail system 108 may be a double rail system, as is shown in FIG. 2B. The rail system 108 may also be a combination of single and double rails. Details of the single and double rail system are disclosed this specification under the section of background and prior art.

Figure 3:
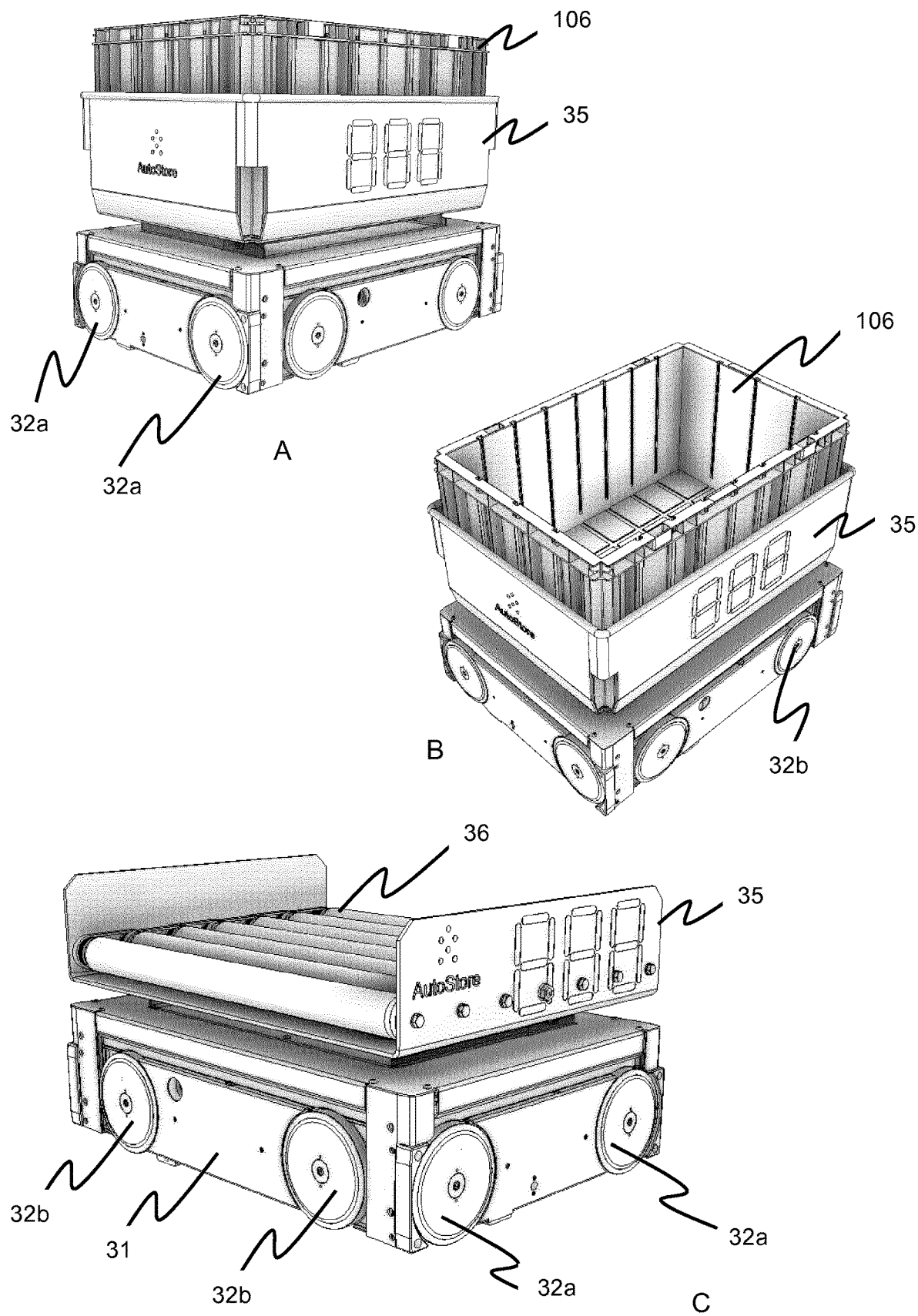
FIGS. 3 A-C show different versions of a remotely operated delivery vehicle arranged for transporting a storage container between a storage grid and a container accessing station.

FIG. 3 A-C shows an embodiment of a remotely operated delivery vehicle 30, hereinafter referred to as a delivery vehicle 30.

The delivery vehicle 30 is configured for transport of a storage container 106 (not shown in FIG. 3C) between an automated storage and retrieval grid 104 (see FIGS. 4 A and B) configured to store a plurality of stacks 107 of storage containers 106, hereinafter referred to as a storage grid 104, and an access opening 63 provided in a container accessing station 60 for handling of the storage container 106 by at least one of a robotic operator and a human operator.

Said delivery vehicle 30 comprises; a vehicle body 31, at least one rolling device 32a, 32b connected to the vehicle body 31, at least one rolling device motor for driving the rolling device 32a, 32b in a horizontal plane (P), and a power source (not shown) connected to the rolling device motor. The power source should provide sufficient power to the rolling device motor (not shown) to propel the rolling device 32a, 32b over a set route from the storage grid 104, for example, to an access station 60.

The delivery vehicle 30 may further comprise a container carrier 35 mounted above the vehicle body 31. The container carrier 35 should be configured to receive the storage container 106, for example, onto or within the container carrier 35, such that the storage container 106 is prevented from sliding in a horizontal plane (P1) with respect to the delivery vehicle 30.

The container carrier 35 may comprise a container supporting device supporting the storage container 106 from below.

In FIG. 3 A-B the container carrier 35 is disclosed in the form of a storage container receiving compartment having a bottom/base and side walls. The volume of the compartment is shown in this exemplary configuration such that it may receive and contain the entire horizontal extent of the storage container and at least a part of the vertical extent of the storage container.

The particular configuration of the container carrier 35 disclosed in 3 A-B allows the delivery vehicle 30 to transport storage containers 106 having different heights. Note that the size of the compartment within the container carrier 35 may easily be adapted for receiving and supporting a multiple number of storage containers 106 in one operation.

FIG. 3 C shows yet another exemplary configuration of the remotely operated delivery vehicle 30. In this configuration the container carrier 35 comprises a base plate, a conveyor arranged on the base plate and two side walls protruding upwards from the base plate. The rolling device 32 and the vehicle body 31 are the same as or similar to the rolling device 32 and the vehicle body 31 described above.

The conveyor may be set up by inter alia a plurality of parallel oriented rolls 36 having a common longitudinal direction perpendicular to the two side walls. In this way the rolls 36 allow one or more storage containers 106 to be shifted into or off the container carrier 35 while being guided by the side walls. The conveyor may be connected to a conveyor motor allowing rotation of one or more of the rolls.

Figure 4:
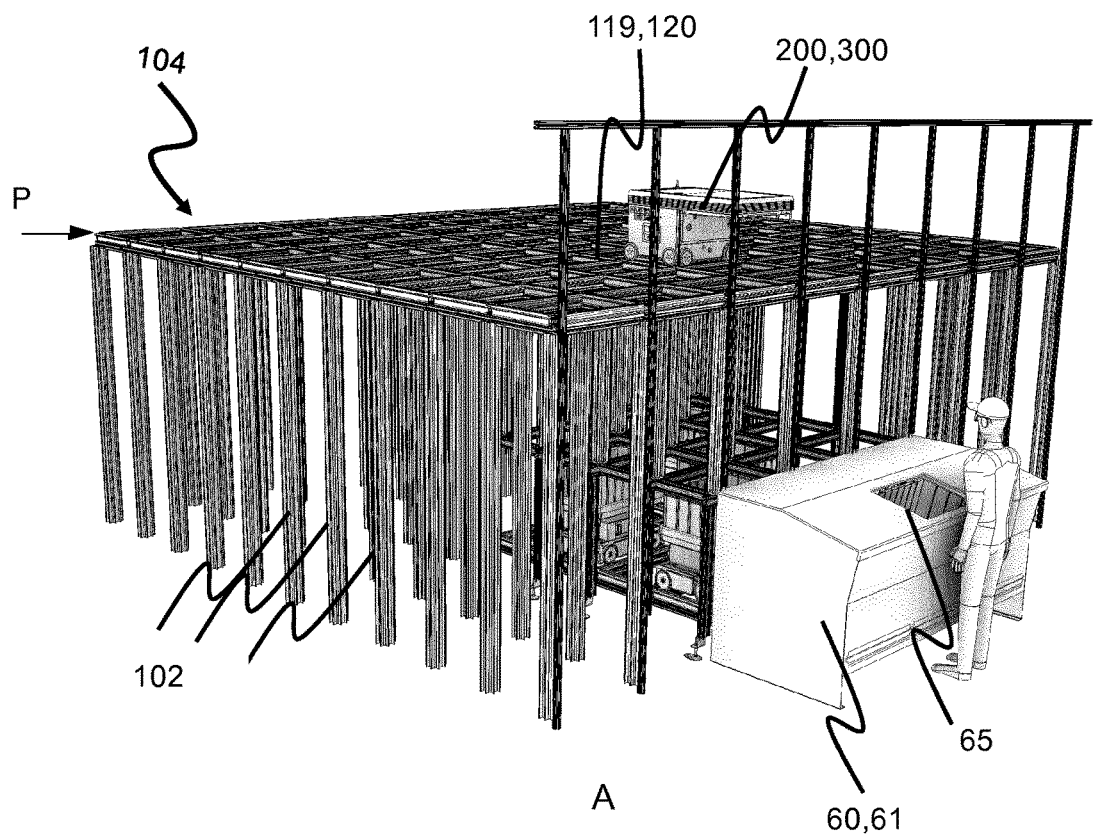
FIGS. 4 A-B are perspective views of other automated storage and retrieval grids and delivery systems for transporting storage containers between the storage grid and a container accessing station.
Figure 4:
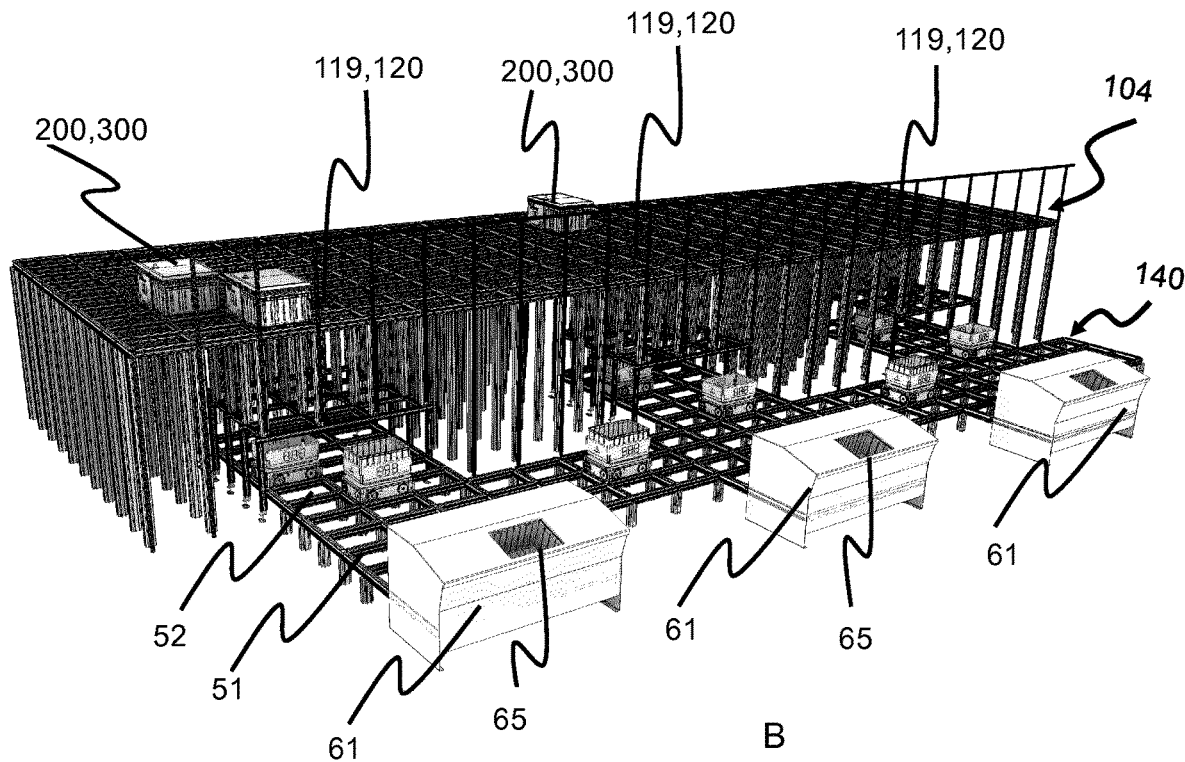

Perspective views of an automated storage and retrieval system are shown in FIG. 4 A-B. The system comprises a storage grid 104 and a delivery system 140 comprising a delivery rail system 50, and a plurality of delivery vehicles 30 operating on the delivery rail system 50.

The storage grid 104 is may be the same as or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119,120 configured to receive a storage container 106 from a container handling vehicle 300.

The delivery system 140 comprises one or more of the delivery vehicles 30 as described above, i.e. delivery vehicles 30 configured to receive and support a storage container 106 for transport between one or more delivery columns 119,120 and one or more container handling stations 60 located outside the storage grid 104. The container handling station 60 may be located in any predetermined position suitable for handling containers.

The delivery system 140 may further comprise a delivery rail system 50 situated below a delivery port 150 of the one or more delivery columns 119,120.

The delivery system 140 is arranged such that storage containers 106 delivered through the delivery column 119, 120 by container handling vehicles or a lift, may effectively be received by a delivery vehicle 30 below the delivery port 150 and transported away on the delivery rails 50 to the container accessing station 60, thereby avoiding congestion of storage container 106 at the delivery columns 119,120.

As shown in FIG. 4 A-B, the delivery rail system 50 may be constructed in the same way or a similar way as the rail system 108 for the container handling vehicles 200,300. The delivery rail system 50 extends at least from the delivery port 150 of one or more delivery columns 119,120, and to the at least one container accessing station 60, such that each storage container 106 can be transported into the container accessing station 60 where items held in the storage container 106 may be accessed.

Figure 5:
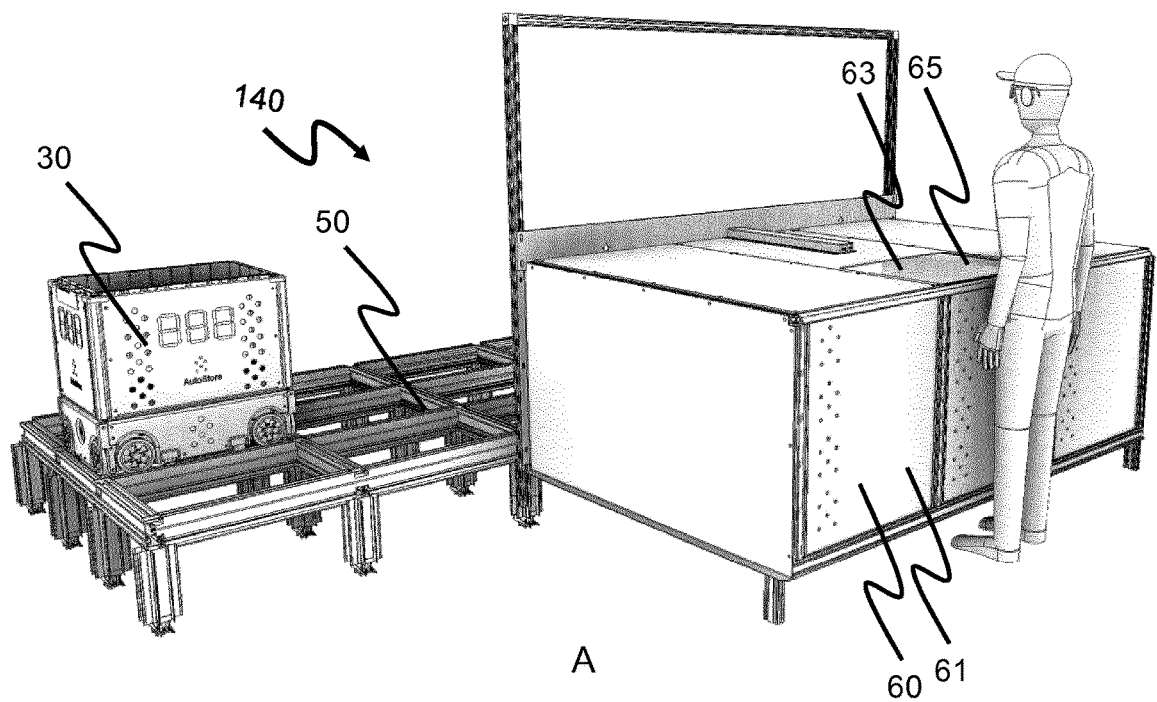
FIGS. 5 A-B show a container accessing station comprising a cabinet according to an embodiment of the present invention where FIG. 5 B shows the inside of the cabinet.
Figure 5:
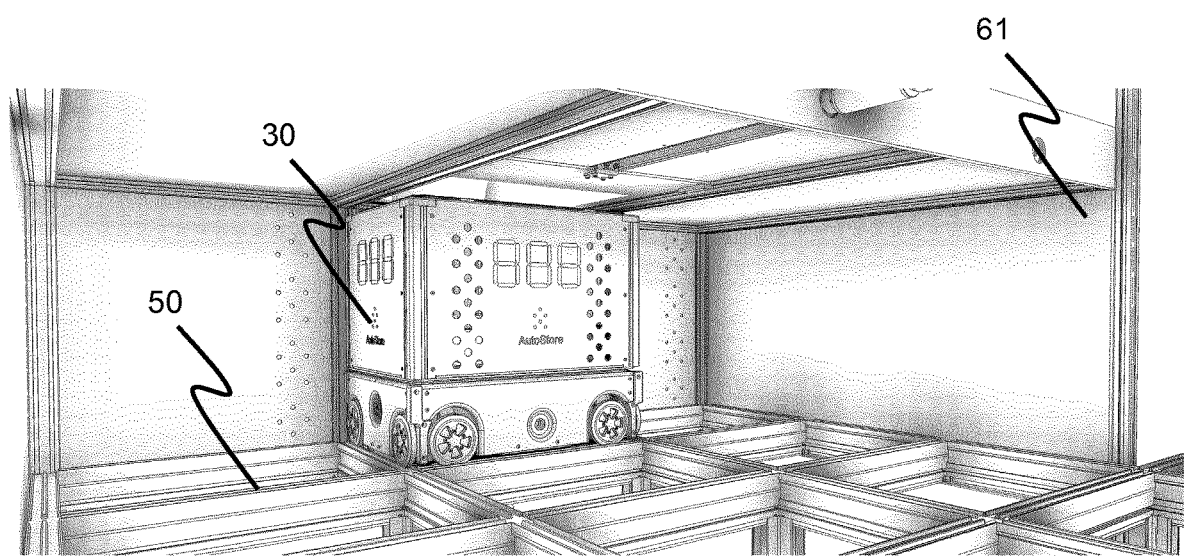
Figure 6:
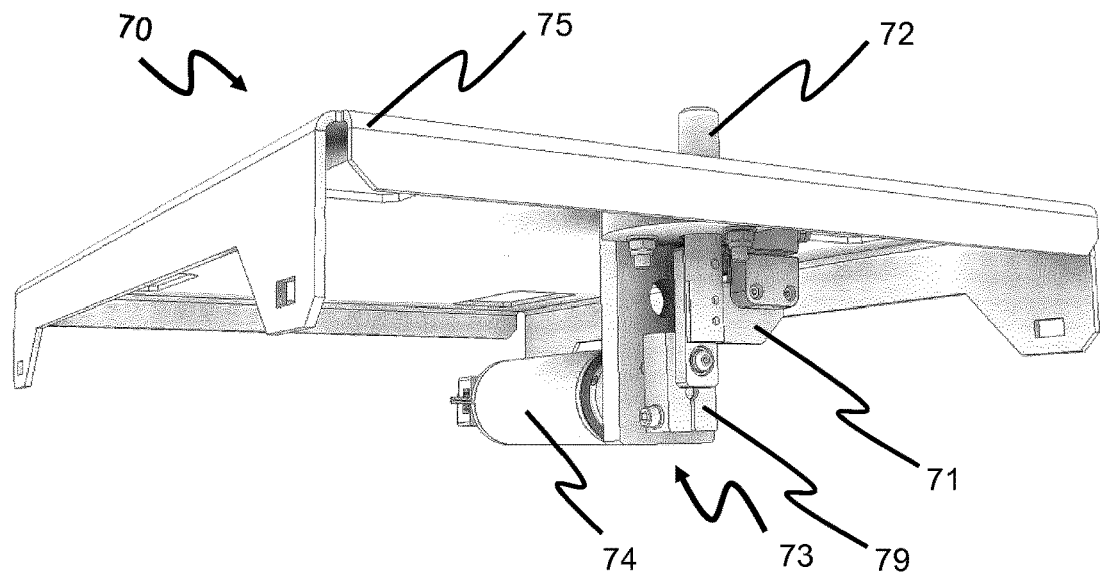
FIGS. 6 A-B show a locking device comprising a locking bolt, a lifting arm and a motor for moving the lifting arm and the locking bolt.
Figure 6:
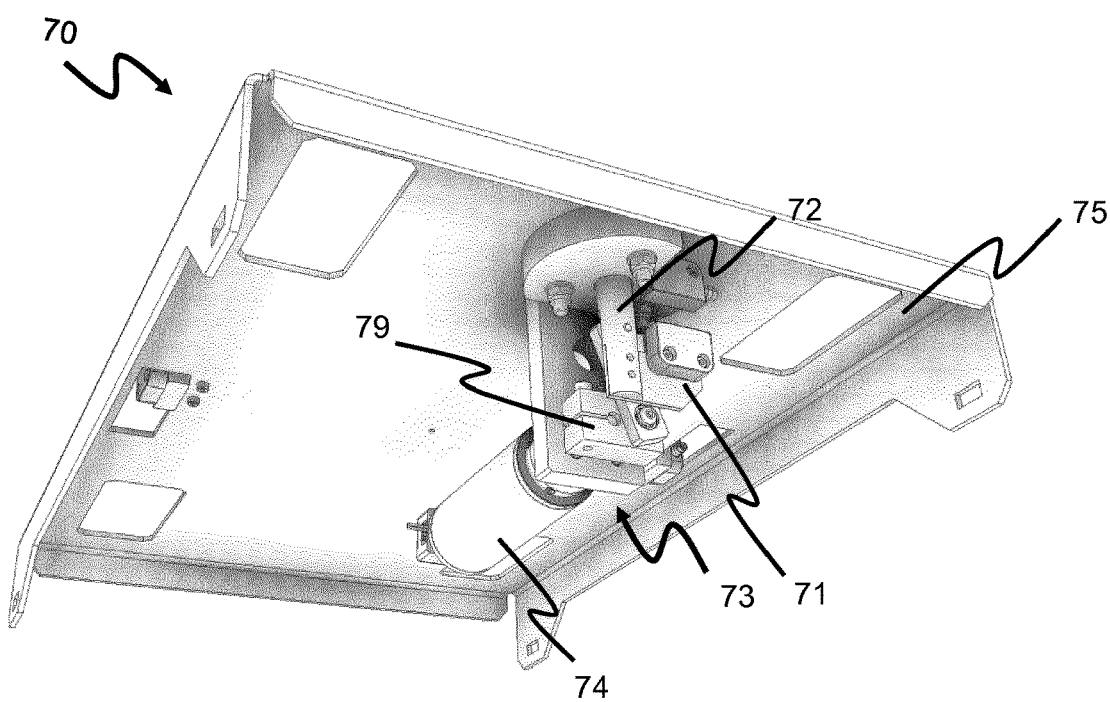

The container accessing station 60 may comprise a cabinet 61 comprising walls and a top cover supported thereon, as shown in FIG. 5 A-B. The items held in the storage containers 106 carried by the delivery vehicle 30 and transported to the container accessing station 60 are reachable through an access opening 63 in the top cover of the cabinet 61.

The cabinet 61 is arranged adjoining the storage grid 104, where the delivery rail system 50 extends from below the delivery ports 150 and to the access point 65 of the container accessing station 60.

The container accessing station 60 comprises an access opening 63 through which a human and/or robotic operator may access contents of the container 106.

Figure 10:
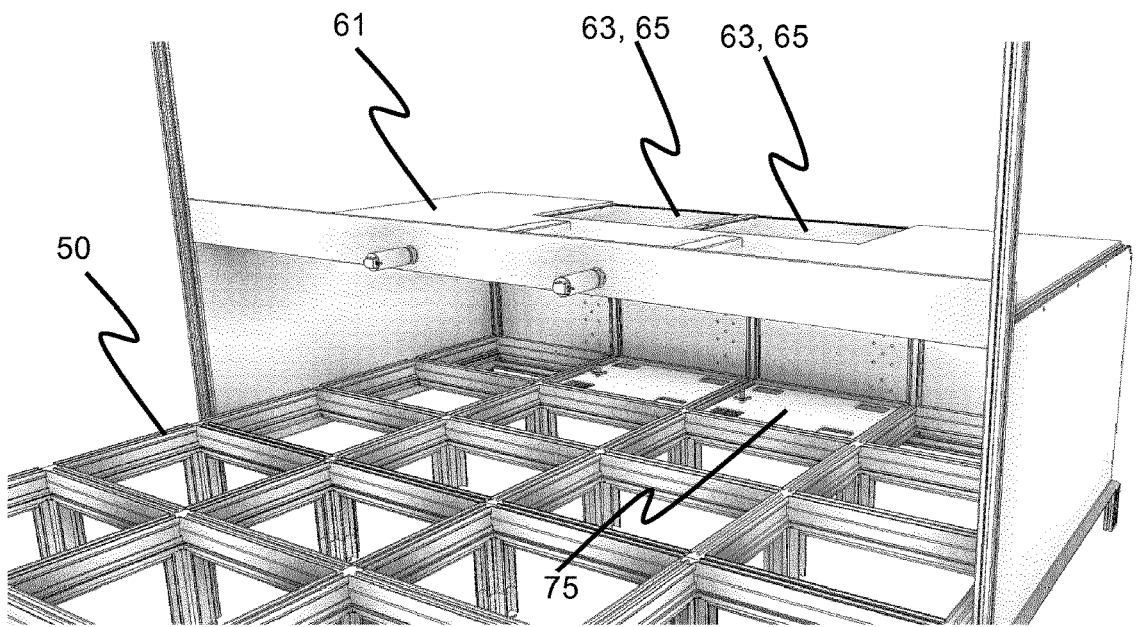
FIGS. 10 A-B show a container accessing station, where FIG. 10 B shows a retractable cover.
Figure 10:
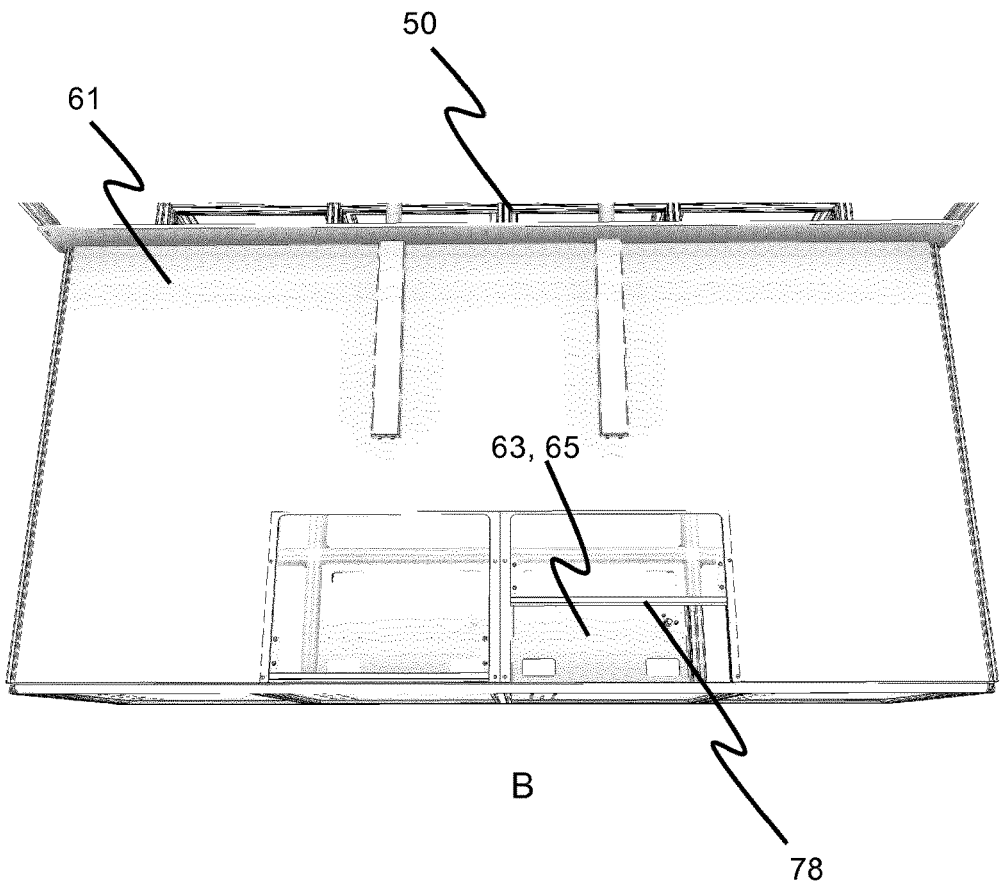

As shown in FIG. 10 B, the container accessing station 60 may comprise a deployable cover 78 for restricting access through the access opening 63. The deployable cover 78 may be a retractable cover 78. The cover may be arranged to open only if predetermined conditions are satisfied (e.g. if access to a container is authorised) and may thereby permit access to a container 106 through the access opening 63 when the container 106 is at the second level. The cover 78 may be transparent and may allow the contents of a container 106 to be viewed from outside the container accessing station 60.

Figure 7:
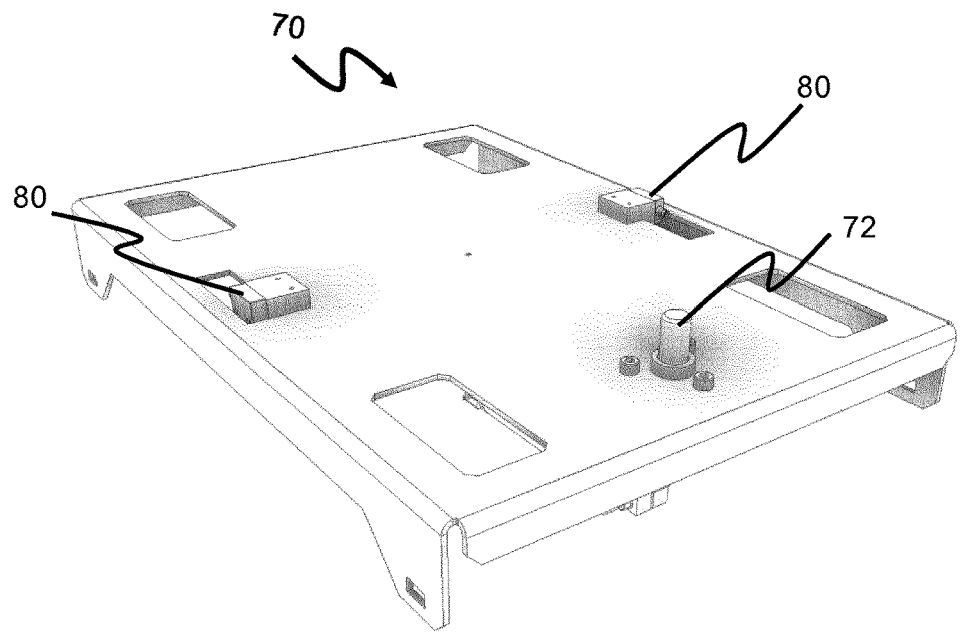
FIGS. 7 A-B
Figure 7:
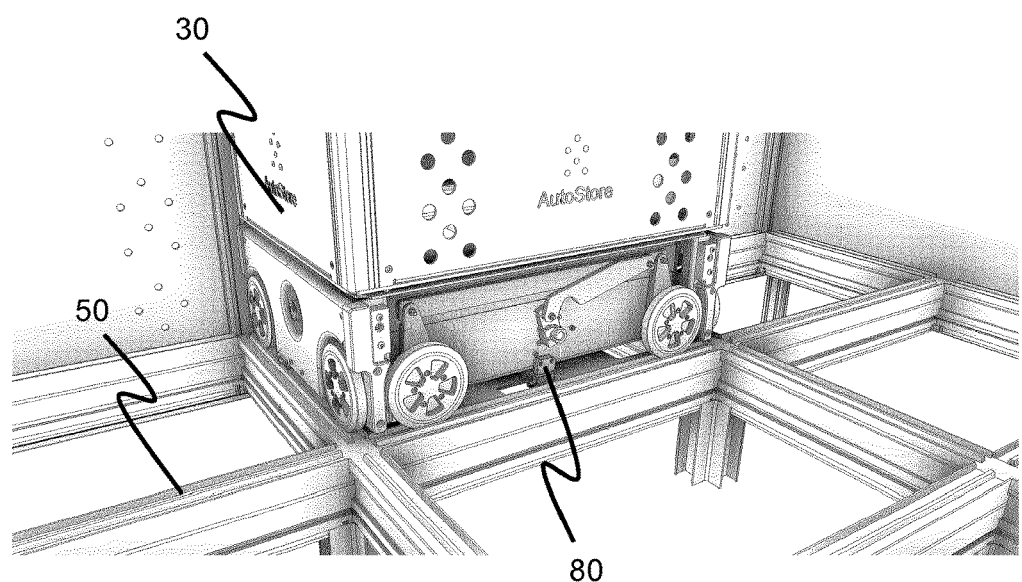

FIGS. 6A-7B show perspective views of an exemplary locking device 70 from below (FIGS. 6A-B) and from above (FIGS. 7A-B).

The locking device 70 may comprise a locking element 71 connected to a locking bolt 72. The locking element 71 may comprise a sensor 80 to detect when the locking bolt 72 has been fully deployed. The sensor may be a magnet sensor, shown in a fully deployed position in FIG. 6A and in a non-deployed position in FIG. 6B. The locking element 71 and locking bolt 72 may be part of an actuator 73 in the form of a linkage comprising movable arm 79 coupled with a link to the locking bolt 72 and locking element 71. The movable arm 79 may be connected to an axle of a motor 74 such that rotation of the axle is converted into linear displacement of the locking bolt 72 through movement of the linkage. Other arrangements are also possible, for example, the locking bolt 72 may comprise a screw thread and rotation of the locking bolt may cause an end thereof to be displaced relative to the panel structure 75.

The mechanism of the actuator 73 in this embodiment is arranged for mounting underneath a panel structure 75. In this example, the locking device 70 is mounted to the underside of the panel structure 75 with bolts.

Actuation of the motor 74 causes one end of the locking bolt 72 to be raised through an opening 76 in the panel structure 75 such that it projects above the panel structure 75 in the fully deployed condition (see FIGS. 6A and 7A). The locking bolt 72 may be arranged to project 1 cm or more, for example, 1.5 cm, 2 cm, 2.5 cm, above a top surface of the rails, such that it engages with a part of the delivery vehicle 30.

The locking bolt 72 is sized and shaped to fit into an opening 77 in the delivery vehicle 30. The locking bolt 72 may be cylindrical and fit into a circular opening 77 in the delivery vehicle 30, as shown, but other configurations are also possible. In this example, the opening 77 is provided in the underside of the delivery vehicle 30 (see FIG. 8B), for example, in a floor panel of the vehicle body 31.

Figure 8:
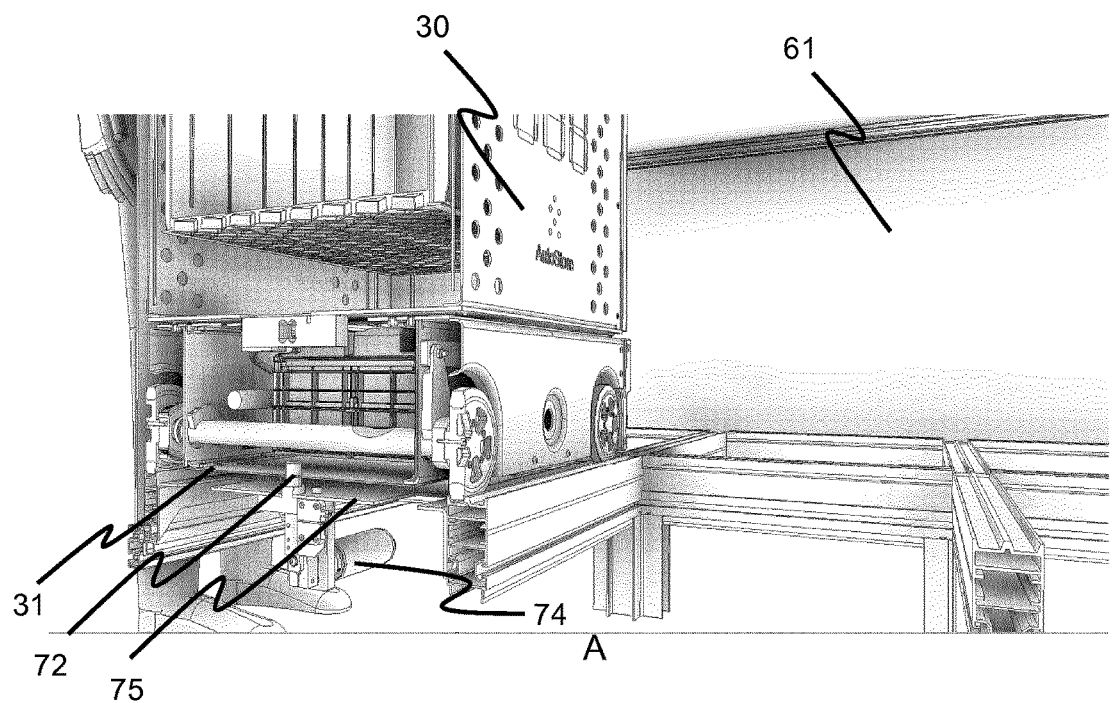
FIGS. 8 A-B show a cross sectional view of a system comprising a remotely operated vehicle, locking device and the grid-based structure and an underside view of the container accessing station with a delivery vehicle positioned on a grid cell adjacent the locking device.
Figure 8:
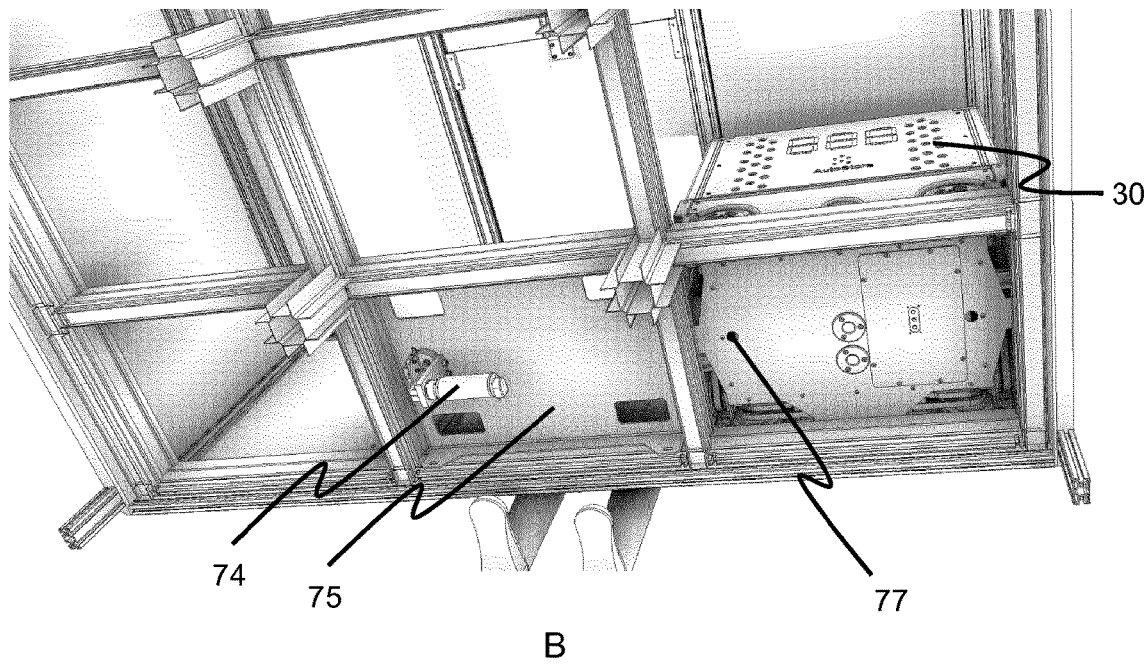
Figure 9:
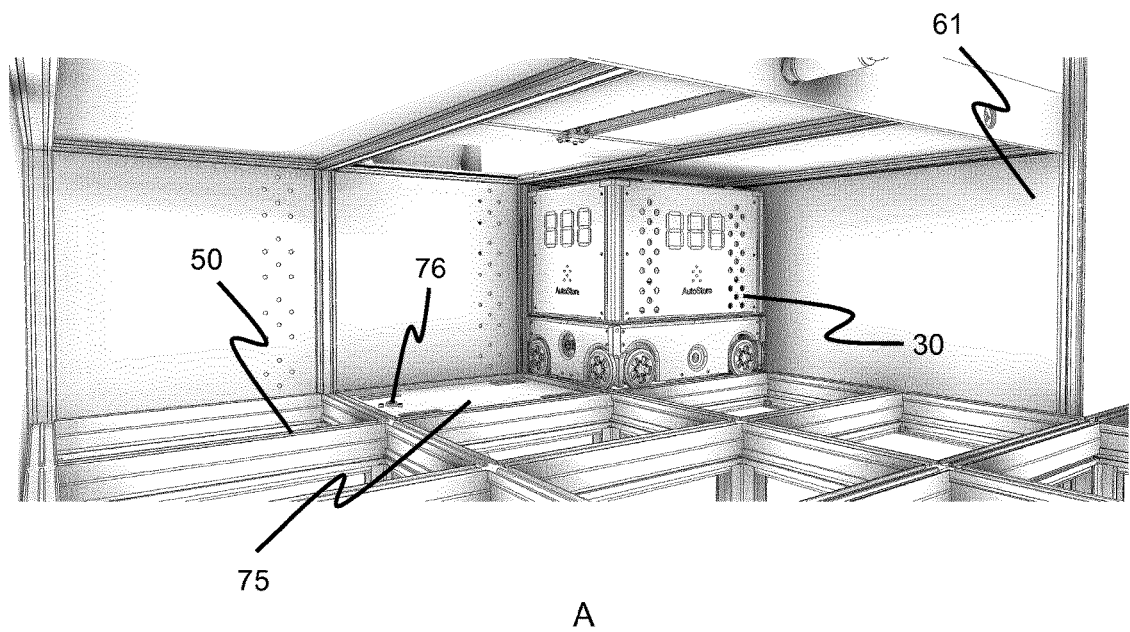
FIGS. 9 A-B show the inside of a container accessing station, a delivery vehicle and a locking device.
Figure 9:
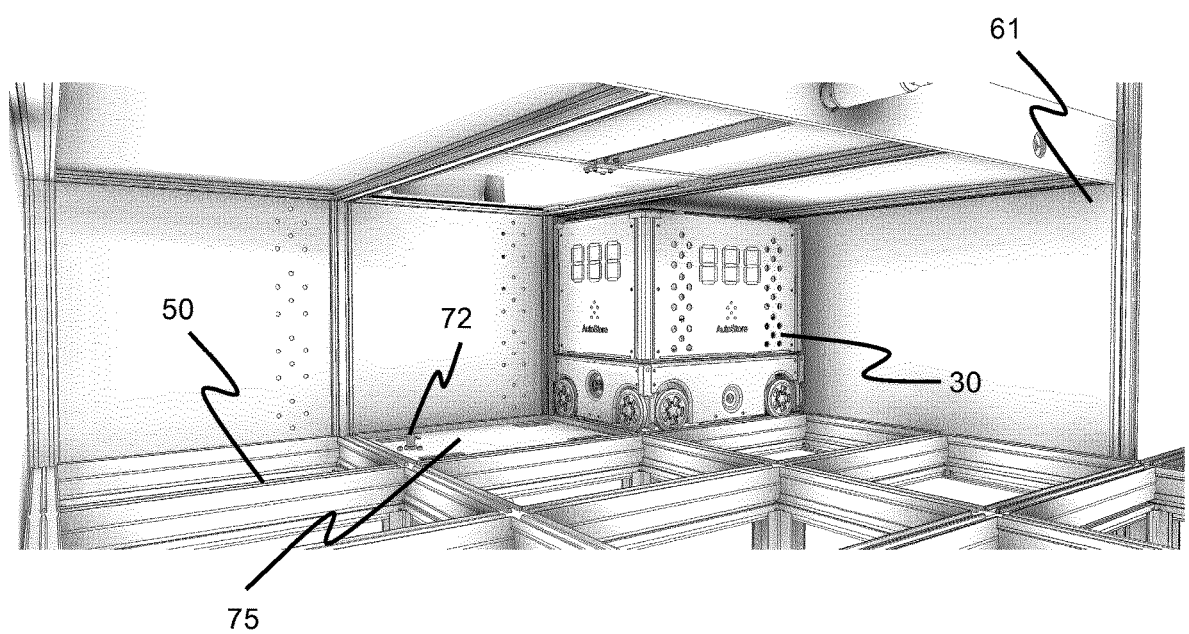

As shown in FIG. 8A, the locking bolt 72 can be deployed to project from the panel structure 75 into the opening 77 in the delivery vehicle 30, to thereby lock the delivery vehicle 30 from accidental displacement, for example, if it was bumped into by a delivery vehicle 30 moving along adjacent delivery grid cells 52.

Thus, the locking device 70 is arranged to be able to lock the delivery vehicle 30 against accidental displacement prior to any interaction with a human operator and/or a robotic operator. In the arrangement shown with the container accessing station 60, this may be before access is allowed to the delivery vehicle 30 or the contents of the storage container 106 carried by the delivery vehicle 30 by the container accessing station 60. The locking device 70 may then unlock the delivery vehicle 30 once interaction with the human and/or robotic operator is no longer required. This may be when access to the delivery vehicle 30 or the contents of the storage container 106 is no longer possible because an access opening 63 of the container accessing station 60 has been closed.

As shown in FIGS. 7A-B, the panel structure 75 may be provided with additional sensors 80 to detect when a delivery vehicle 30 is in position above the panel structure 75. The sensor 80 may be a magnet sensor or a light sensor. In this way, the deployment of the locking bolt 72 can be automatic once the delivery vehicle 30 is in position. The sensors 80 also ensure that damage is not caused to the delivery vehicle 30, for example, through misalignment on the delivery grid cell 52 when the locking bolt 72 is deployed.

In a container accessing station 60, the delivery grid cell 52 that is arranged beneath an access point 65 is not required for storage purposes. Consequently, the provision of a locking device 70 mounted on a support, for example, a panel structure 75 or a beam (not shown), extending across the delivery grid cell 52, is not a problem.

As shown in FIGS. 10A-B, the container accessing station 60 may comprise multiple access points 65, for example, arranged side-by-side.

As shown in FIGS. 6A-B, the panel structure 75 is of a size that fits within an opening defined by the rails of the delivery grid 51. The panel structure 75 may comprise mounting features which allow the panel structure 75 to be retrofitted to the rails of an existing delivery grid 51, for example, by using bolts. In this way, an existing automated storage and retrieval systems can be upgraded to lock delivery vehicles 30 in place at an access point 65 prior to interaction with a human and/or robotic operator.

The locking device 70 may also be used in a service area to lock a remotely operated vehicle 30,200,300 in place when it is due to be serviced by a human or robotic operator. The locking device 70 may also be used in other parts of the automated storage and retrieval system, for example, in locations where a vehicle is being charged or is having a battery replaced.

REFERENCE NUMERALS

30 Delivery vehicle
31 Vehicle body
32 Rolling device
32*a* First set of wheels
32*b* Second set of wheels
35 Container carrier
36 Rolls of conveyor
50 Delivery rail system
51 Delivery grid
52 Delivery grid cell
60 Container accessing station
61 Cabinet
63 Opening top cover of cabinet/access opening
65 Access point
70 Locking device
71 Locking element
72 Locking bolt
73 Actuator
74 Motor
75 Panel structure
76 Opening panel structure
77 Opening vehicle body
78 Deployable cover
79 Moveable arm
80 Sensor
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
140 Delivery system
150 Delivery port
200 First container handling vehicle
201 Wheel arrangement
300 Second container handling vehicle
301 Wheel arrangement
X First direction
Y Second direction
P Horizontal plane of rail system

The invention claimed is:

1. An automated storage and retrieval system comprising a grid-based rail structure and a plurality of remotely operated vehicles arranged to operate on the grid-based rail structure,
   the automated storage and retrieval system comprising a locking device arranged in a zone of the grid-based rail structure where a human and/or a robotic operator is permitted to interact with the remotely operated vehicle or contents of a storage container that the remotely operated vehicle is carrying, the locking device being arranged to latch to the remotely operated vehicle, and to lock the remotely operated vehicle against accidental displacement prior to interaction with the human and/or robotic operator, wherein the locking device being arranged to unlock the remotely operated vehicle once interaction with the human and/or robotic operator is no longer required, wherein the grid-based rail structure is a delivery rail system and the remotely operated vehicle is a delivery vehicle operating on the delivery rail system, and wherein the delivery rail system comprises at least a first set of parallel rails arranged in a horizontal plane and extending in a first direction, and at least a second set of parallel rails arranged in the horizontal plane and extending in a second direction which is orthogonal to the first direction, the first and second sets of rails together defining a delivery grid of delivery grid cells, and wherein the delivery vehicle comprises a motorized vehicle body and a container carrier provided above the motorized vehicle body for carrying a storage container of the storage containers, and wherein the delivery vehicle is moveable on the delivery grid of the delivery rail system, wherein the zone is an access point adapted for handling of items held in storage containers by a robotic operator or human operator, the delivery grid provides one or more delivery grid cells for the remotely operated delivery vehicle at the access point as well as a plurality of delivery grid cells adjacent the one or more delivery grid cells of the access point, such that there is more than one path to and/or from the access point for the remotely operated delivery vehicle via the plurality of delivery grid cells, wherein the container accessing station comprises a cabinet comprising walls and a top cover supported thereon, wherein the items held in the storage container carried by the delivery vehicle at the access point is reachable through an access opening in the top cover, wherein the container accessing station may comprise a deployable cover for restricting access through the access opening, wherein the deployable cover is a retractable cover arranged to open only if the delivery vehicle has been locked and thereby permit access to the container through the access opening, and wherein one or more sensor is arranged to detect a delivery vehicle in a locking position and one or more sensor is arranged to register the position of the retractable cover.

2. The system according to claim 1, wherein the locking device comprises a locking element comprising at least one of a magnet, a spring-loaded device, a gripper, a lift, a barrier and an interacting device for interacting with the vehicle.

3. The system according to claim 2, wherein the locking device comprises an actuator for moving the locking element.

4. The system according to claim 3, wherein the actuator comprises a motor.

5. The system according to claim 3, wherein the locking element is a locking bolt arranged for interacting with the remotely operated vehicle.

6. The system according to claim 2, wherein the locking device comprises a support which holds the locking element in position within a delivery grid cell.

7. The system according to claim 1, wherein the access point is arranged in a container accessing station and wherein the delivery grid extends to or into a container accessing station.

8. A method of accessing a storage container through a container accessing station of a delivery system, wherein the delivery system comprises:

a delivery rail system comprising at least a first set of parallel rails arranged in a horizontal plane and extending in a first direction, and at least a second set of parallel rails arranged in the horizontal plane and extending in a second direction which is orthogonal to the first direction, the first and second sets of rails together defining a delivery grid of delivery grid cells, a remotely operated delivery vehicle comprising a motorized vehicle body and a container carrier provided above the motorized vehicle body for carrying a storage container of the storage containers, and wherein the delivery vehicle is moveable on the delivery grid of the delivery rail system, and an access point comprising an access opening through which a human and/or robot may access contents of the storage container carried into the access point on the delivery vehicle;

the access point comprises a retractable cover for closing and opening the access opening;

a vehicle locking device is arranged to latch to the delivery vehicle, and to lock the delivery vehicle at the access point; and a sensor for registering a position of the delivery vehicle;

the method comprises:

operating the delivery vehicle carrying the storage container to the delivery grid cell at the access point;

locking the delivery vehicle at the access point by the locking device when the sensor sends a signal that the delivery vehicle is in position;

opening the retractable cover when the delivery vehicle is locked by the locking device;

accessing the storage container through the access opening;

closing the access opening by moving the retractable cover;

unlocking the delivery vehicle when retractable cover is closed.

* * * * *